Dec. 3, 1935. W. V. KRUSE 2,023,232
SOLDERING APPARATUS FOR CAN BODIES AND THE LIKE
Filed Nov. 8, 1934
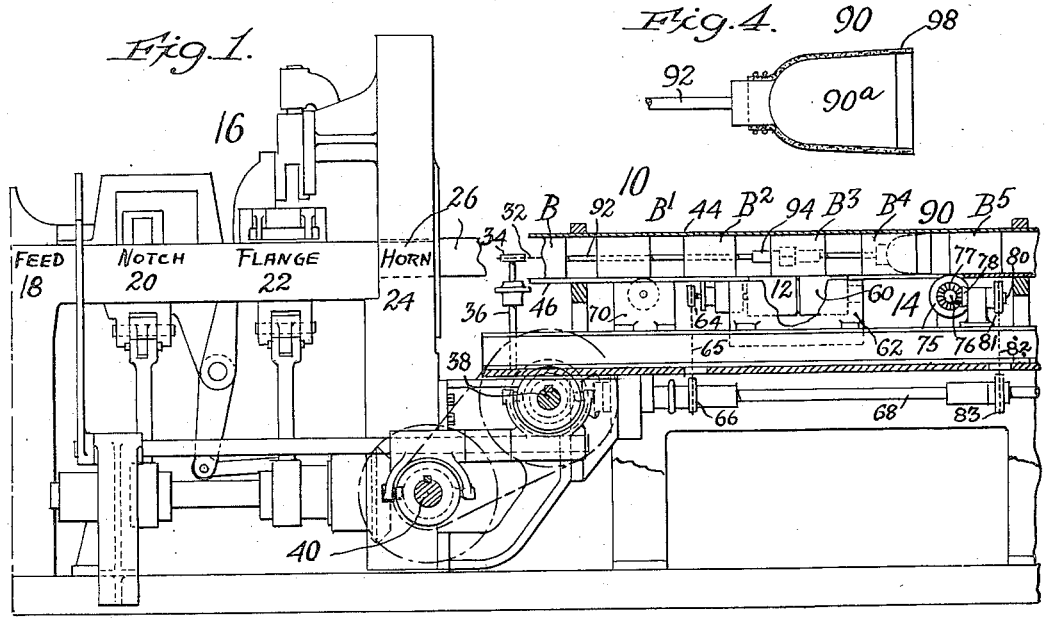
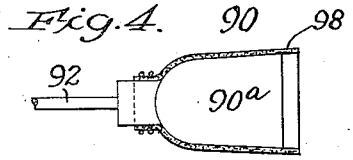
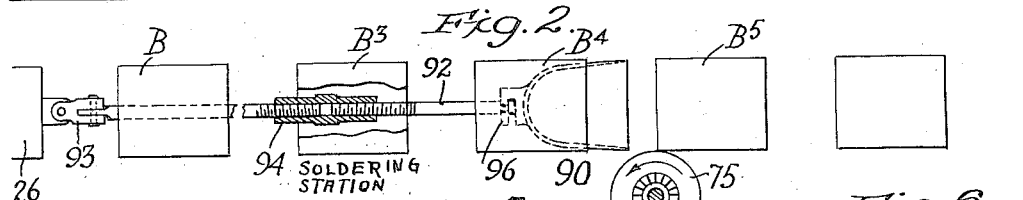
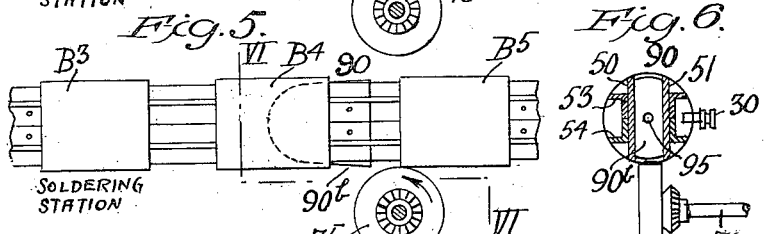
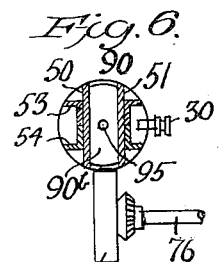
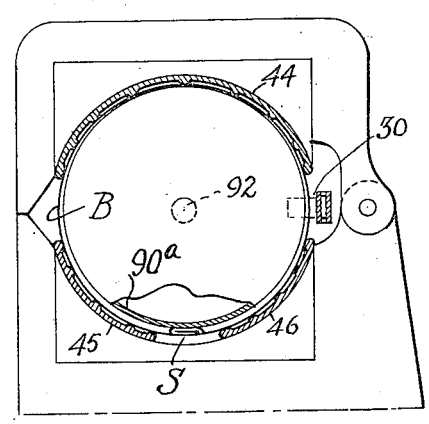
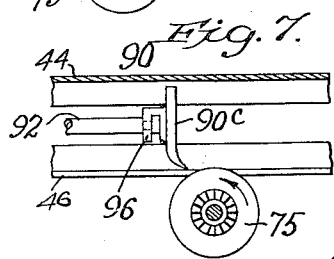
INVENTOR.
WILDINE V. KRUSE.
BY
Gustave R. Thompson
ATTORNEY Patented Dec. 3, 1935

2,023,232

UNITED STATES PATENT OFFICE 2,023,232

SOLDERING APPARATUS FOR CAN BODIES AND THE LIKE

Wildine V. Kruse, Brooklyn, N. Y.

Application November 8, 1934, Serial No. 752,031

10 Claims. (Cl. 113—60)

This invention relates to apparatus for soldering the seams of tubular bodies, such as can-bodies, for example, and provides improvements therein.

In the manufacture of can-bodies, the usual procedure is to feed successive can-bodies along a "solder-horn" or conveyor to a soldering device, where molten solder is applied to the longitudinal seam or joint where the edge-portions of the tubularly shaped sheet forming the can-body lap or are joined, and thence to a rotary wiping device where excess solder is removed from the joint and contiguous parts of the can-body. In practice, particles of solder are thrown off from the rotary wiper, some of which enter can-bodies which are moving in spaced relation along the solder-horn or conveyor, and stick to the inside of the can-body, contaminating the contents of the cans later when they are completed and filled, and providing seats or spots of local corrosion.

With the advent of wider use of enameled cans, more exacting requirements in the quality of cans, and more rapidly operating machinery, the objections to solder-particles on the inside of cans have become more pronounced and of serious concern to the can-manufacturer. On the enameled surface of a can the effects of a speck or particle of solder are much more noticeable than on a plain can, because the hot solder affects the enamel coating and a discoloration or penumbra is formed around the speck of solder, which is of considerably greater diameter than that of the speck. Moreover with the lighter metal coatings (tin for example) used in recent years on plate, the corrosion in filled cans specked with solder is greater, and the effect on users of the canned goods has been detrimental to the use of that kind of goods.

The present invention provides improved soldering mechanism comprising means for preventing particles of molten solder thrown off from the wiping device entering and falling upon the inside of the can, or other tubular, bodies.

Embodiments of the invention are illustrated in the accompanying drawing, wherein;

Fig. 1 is a view partly in side-elevation and partly in longitudinal section of one embodiment of my improved soldering-mechanism, and shown in association with a body-making machine, the solder-horn illustrated being of the exterior type.

Fig. 2 is a view, on an enlarged scale, of certain parts shown in Fig. 1, to more clearly show the action of the mechanism.

Fig. 3 is a transverse section, on an enlarged scale, of the solder-horn shown in Fig. 1.

Fig. 4 is a detail view, on an enlarged scale, of a modification of the shield forming part of the mechanism shown in Fig. 1.

Fig. 5 is a view similar to Fig. 2, but illustrating an interior type of solder-horn.

Fig. 6 is a transverse section on the line VI—VI, Fig. 5.

Fig. 7 is a view partly in side elevation and partly in longitudinal section of parts of a further embodiment of the invention.

Referring to said drawing, numeral 10 designates a conveyor of a suitable type, 12 a molten solder applying device, and 14 a wiper.

The invention is here illustrated as an adjunct to a body-maker 16 of any usual and well-known type or construction. In the type of body-maker illustrated, blanks cut from sheet-metal are fed from a hopper at station 18, notched at the longitudinal edges at station 20, flanged at the longitudinal edges at station 22, and, at the next station 24, wrapped around a horn 26, the flanged edges lapped and hooked together, and the hooked edges pressed or "bumped" to form a locked-seam. From the station 24, the tubular bodies (indicated by B to B⁵) are transferred to the conveyor 10, which, in the can making art, is usually referred to as the solder-horn. The tubular-bodies transferred from the body-maker horn 26 to the conveyor or solder horn 10 (or received from any other source) are moved successively along the solder-horn, past the soldering-device and wiper 14, by fingers 30 (Fig. 3) on an endless feed chain 32, or other suitable means, forming part of the conveyor. The feed-chain 32 may be driven by a sprocket 34 on a shaft 36, driven from a cross-shaft 38, which latter may be in turn driven from a cross-shaft 40 forming part of the body-maker.

The solder-horn or conveyor 10 may be of the exterior type or of the interior type. Both types are illustrated. The exterior type, shown in Figs. 1, 3 and 7 may comprise curved plates 44, 45, 46 running longitudinally of the conveyor, the plate 44 being spaced from one or both of plates 45, 46, to provide a space for the feed-fingers 30 to run, and the plates 45, 46 are spaced throughout or at desired locations to provide a space for access of the soldering-device 12, wiper 14, etc., to the seam S of the tubular-bodies B etc. The interior-type of solder-horn, shown in Figs. 5 and 6, may comprise spaced longitudinal plates 50, 51, to the outer sides of which are fastened longitudinal angle-pieces 53, 54, forming a groove within which the feed-fingers 30 may run.

The soldering-device 12 may comprise a roller 60 running in a pot 62 of molten-solder, the roller 60 being turned by suitable means, as a sprocket 64, chain 65, sprocket 66, and longitudinal shaft 68 driven from said cross-shaft 38. One common form of device for applying cleaning acid and flux to the seams of the tubular bodies at a position in advance of the soldering position is shown at 70.

The wiping device 14 may comprise a rag-wheel 75 mounted on a spindle 76, which is rotated in suitable manner, as by bevel gears 77, 78, spindle 80, sprocket 81, chain 82, and sprocket 83 on said shaft 68.

In operation, molten solder is applied by the roller 60 to the seams S of the tubular bodies B etc., at the exteriors of the bodies, as they are moved in succession past the soldering device 12. From the soldering device 12 the tubular bodies pass to the wiping device 14. The rotary wheel 75 wipes surplus solder, which remains soft or molten, from the seams S and from the parts of the tubular bodies immediately adjacent the seams. As the wheel 75 turns the soft or molten solder is thrown off and down from the wheel. But some particles adhere to the wheel, are carried around by it, and are thrown off upwardly. As the tubular-bodies B etc. are usually spaced somewhat on the conveyor 10 some of these particles of molten solder thus thrown off are projected through the space between the plates 45, 46, Figs. 1, 3 and 7 (or between the plates 50, 51, Figs. 5 and 6), and would enter and strike the inner sides of the tubular bodies, with the defacements and other objectionable consequences heretofore referred to, unless the apparatus be provided with means for preventing these consequences.

According to the present invention I provide a means for preventing the particles of molten solder entering and falling upon the inside of the tubular-bodies. The prevention-means may have the form of a shield 90, and is preferably positioned in line with the conveyor and in such manner as to be passable by, and through the interiors of, the tubular-bodies. The shield 90 may have the form of cups 90ª, 90ᵇ as shown in Figs. 1–6, or of a plate 90ᶜ, as shown in Fig. 7. The cup 90 has an exterior diameter slightly less than the interior diameters of the tubular-bodies, and is positioned on the solder-horn 10 within the plates 44, 45, 46, near the wiper 14 with its open side facing the trajectories of the molten particles of solder thrown off by the wiper through the space between the plate 45, 46. The cup 90ª is held in position by a rod 92 running through the interior of the solder-horn and attached to the end of the horn 26 of the body-maker. The attachment of the rod 92 to the horn 26 is preferably a universal-connection 93 to provide easy universal transverse movement of the cup 90ª in the solder-horn. Adjustment-means, as a turnbuckle 94 is also preferably provided in order that the longitudinal position of the cup 90ª with respect to the wiping-device 14 may be adjusted for its best functioning. The cup 90ᵇ Figs. 5 and 6, is positioned in the space between the plates 50, 51, and may be held therein by means of a rivet 95 or other suitable means. The cup 90ᵇ is of such dimensions that the bodies B, etc. can pass over the same as they are fed along the solder-horn. The cups 90ª and 90ᵇ are preferably slightly tapered, to facilitate the passage of the tubular-bodies, and the outer edges of the cup 90ᵇ may be flexible.

In order that the apparatus may be adapted for tubular-bodies of different shape and diameter, the cup 90ª is provided with means detachably connecting it to the rod 92, which means, as here shown may be formed of a panel joint 96. For tubular-bodies of different size and shape, the conveyor of the soldering apparatus is provided with appropriately shaped solder-horns, and when a different solder-horn is mounted on the apparatus, the cup 90ᵇ may be disconnected at the joint 96 and an appropriately shaped cup substituted. The same kind of joint 96 may be provided for shield 90ᶜ, Fig. 7.

The shields are provided with body-contacting surface-portions of a character to slide on the inside enameled surfaces of tubes without marring such surfaces. For this purpose the outer surfaces of the shields may be highly polished, so that the tubular-bodies may slide under the shields without being scratched. The shields may also be provided with an outer covering 98, of soft material, such as felt or leather, to prevent scratching of the tubular-bodies.

The shields may be made so as to be repellant to molten solder. For this purpose the shields may be highly polished, and then provided with a coating of chromium, or be made of a chromium alloy.

As will be apparent from the foregoing description, particles of molten solder which are thrown off upwardly by the wiper 14 will be prevented by the shields, or equivalent means, from entering and falling upon the inside of the tubular-bodies. The shields will intercept the said projecting particles of molten solder, and with a cup form of the shield will collect in the cup. The cup being of metal of good conductivity, will quickly chill and solidify the molten solder. Where the shield is of a solder-repellant material, the chilled and solidified particles of solder will fall off, and where they may fall into the tubular-bodies, they will not adhere to the same, but roll out during the subsequent handling of the tubular-bodies.

The invention may receive other embodiments than those herein specifically illustrated and described.

What is claimed is:

1. Apparatus for soldering the seams of tubular bodies, comprising a solder-horn and means for moving tubular bodies along said solder-horn, a molten-solder applying device, a rotary device for wiping surplus solder from the seam and contiguous parts of the body, and a shield for preventing particles of molten solder thrown off from the wiping device entering and falling upon the inside of the tubular bodies, said shield having a fixed location within the solder-horn and having transverse dimensions smaller than the transverse dimensions of the solder-horn, so as to be passable by, and through the interiors of, the tubular bodies.

2. Apparatus for soldering the seams of tubular bodies, comprising a solder-horn and means for moving tubular bodies along said solder-horn, a molten-solder applying device, a rotary device for wiping surplus solder from the seam and contiguous parts of the body, and a cup-shaped shield for preventing particles of molten solder thrown off from the wiping device entering and falling upon the inside of the tubular bodies, said cup-shaped shield having a fixed location within the solder-horn and having transverse dimensions smaller than the transverse dimensions of the solder-horn, so as to be passable by, and through the interiors of, the tubular bodies, with its open side facing the trajectory of the particles of molten solder thrown off by the wiper.

3. Apparatus according to claim 1, wherein said prevention-means has a surface-portion adhesion-repellent to molten solder.

4. Apparatus according to claim 1, wherein said shield has a body-contacting surface-portion of a character to slide on the inside enameled surfaces of tubes without marring.

5. Apparatus according to claim 1, wherein said shield has a soft-material covering.

6. Apparatus according to claim 1 wherein said shield has a highly polished and chromium-plated body-contacting surface portion.

7. Apparatus according to claim 1, further including flexible means for retaining said shield in position.

8. Apparatus according to claim 1, further including means for adjusting the position of said shield with reference to said wiper.

9. Apparatus according to claim 1, wherein said solder-horn is of the interior-type having spaced longitudinal plates, which contact with the inside of the tubular bodies.

10. Apparatus according to claim 1, wherein said solder-horn is of the exterior-type having spaced longitudinal plates which contact with the outside of the tubular bodies.

WILDINE V. KRUSE.